United States Patent [19]

Engel

[11] 4,317,257

[45] Mar. 2, 1982

[54] ANIMAL CARRYING AND SKINNING DEVICE

[76] Inventor: A. Richard Engel, San Jose, Calif.

[21] Appl. No.: 122,432

[22] Filed: Feb. 19, 1980

[51] Int. Cl.³ .............................................. A22B 5/16
[52] U.S. Cl. .......................................... 17/21; 294/74
[58] Field of Search ........................ 17/21, 50; 294/74

[56] References Cited

U.S. PATENT DOCUMENTS

| 2,199,958 | 5/1940 | Mazzella | 294/74 |
| 2,819,923 | 1/1958 | Anderson | 294/74 |
| 3,129,454 | 4/1964 | Johnson | 17/21 |
| 3,209,395 | 10/1965 | Jones et al. | 17/21 |
| 3,871,084 | 3/1975 | Carrington et al. | 17/21 |
| 4,022,507 | 5/1977 | Marino | 294/74 |
| 4,043,581 | 8/1977 | St. Germain | 294/74 |
| 4,093,292 | 6/1978 | Marcet et al. | 294/74 |

FOREIGN PATENT DOCUMENTS 249881  8/1912  Fed. Rep. of Germany .......... 17/21

*Primary Examiner*—Willie G. Abercrombie
*Attorney, Agent, or Firm*—Gerald L. Moore

[57] ABSTRACT

A device for attachment to the skin of a meat animal to be pulled by a power device and strip the skin from the animal carcass. In addition the device can be used for carrying or dragging the animal and for hanging the carcass after skinning.

2 Claims, 8 Drawing Figures

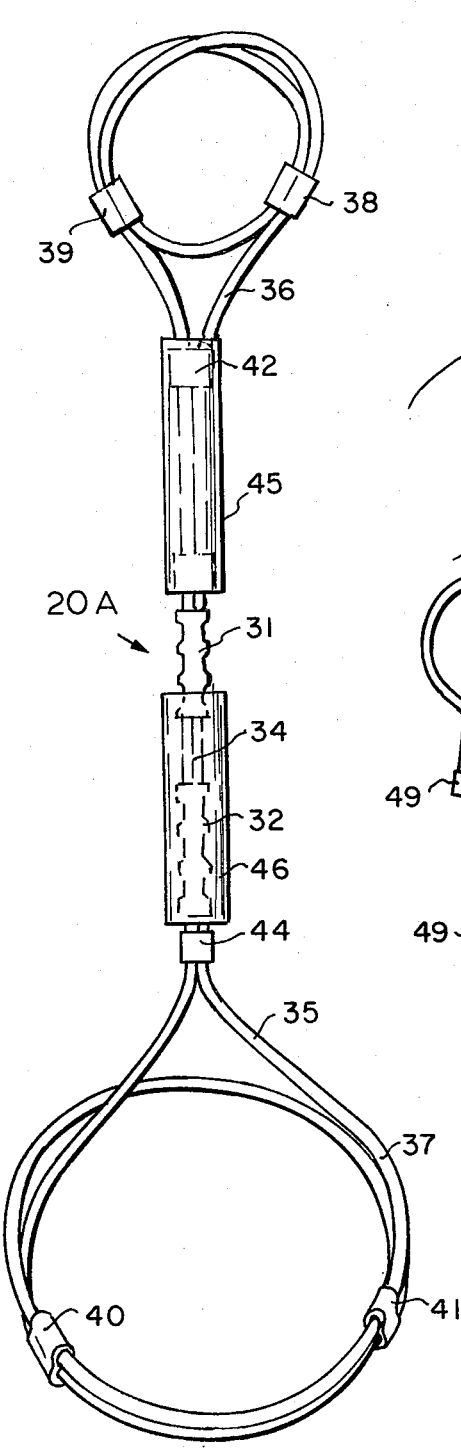
FIG. 5.
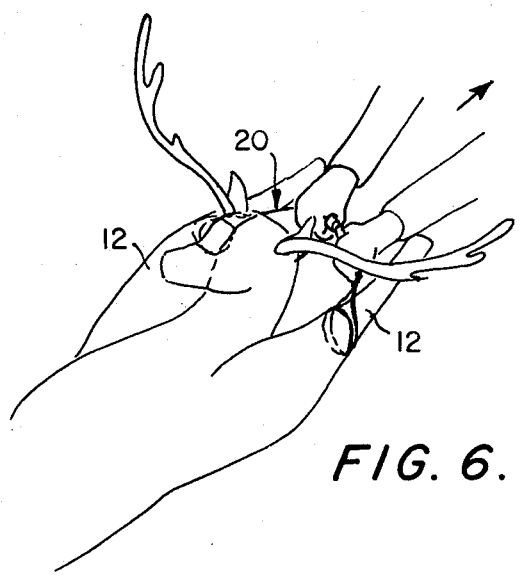
FIG. 6.
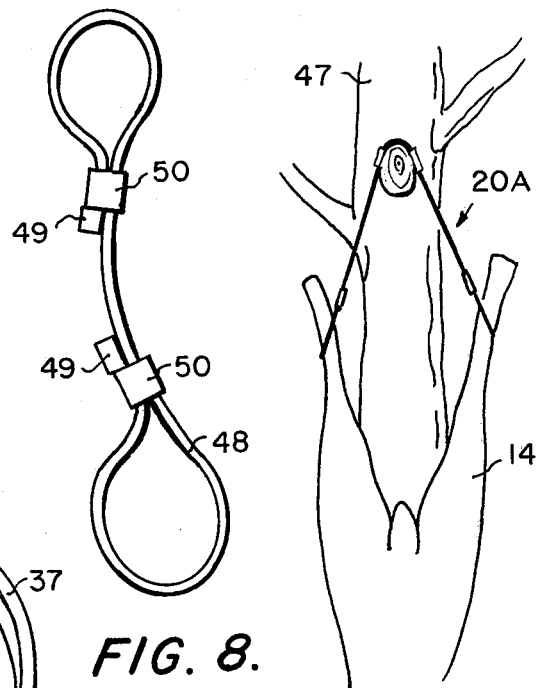
FIG. 8.
FIG. 7.

ANIMAL CARRYING AND SKINNING DEVICE

BACKGROUND OF THE INVENTION

This invention is for hunters for carrying and skinning large animals such as deer, antelope, elk and the like. After a kill is made the real backbreaking work of transporting the animal out of the woods and field dressing and skinning the animal begins. The animals are usually too large to be carried and therefore must be dragged to the nearest road for loading into a vehicle. Usually such transporting is accomplished now by grabbing hold of the antlers and dragging the body along the ground.

After the animal is field-dressed, it is necessary to remove the skin or hide in preparation for refrigerating and cutting up the carcass. A method for skinning is disclosed in U.S. Pat. No. 3,871,084, entitled: Deer Skinning Apparatus and Method of Using Same, and issued on Mar. 18, 1975, to Carrington et al. As described in that patent, a deer or other large meat animal can be skinned by attaching the animal by the neck to a tree and fixing a pulling device to the hide at the back of the neck after the skin has been cut around the neck and down the stomach from the neck to the annus. The legs are also removed at the elbow joint.

By pulling on the device such as with a vehicle the skin literally can be peeled from the carcass in one motion. This skinning method not only is less laborious but also prevents the carcass from being cut repeatedly as frequently happens when the skin is cut away by hand. Also the hair or fur is prevented from touching the carcass and requiring an even more tedious cleaning procedure.

As pointed out in the above-mentioned patent, the successful use of the power skinning method depends upon a simple and foolproof attachment device for fixing the pulling cable to the animal skin. The patent discloses a rather bulky pulling device for such attachment. It is the purpose of the present invention to provide a pulling device for skinning large animals which device is simple and lightweight and can also be used for attachment to the animal to provide a hand-hold for carrying the animal out of the field and for hanging the carcass for draining.

SUMMARY OF THE INVENTION

A device primarily for use in fastening to the skin of a meat animal so that skin can be pulled from the carcass comprising a sleeve member and an elongated flexible member such as a cable passed through a center opening in the sleeve member to form loops extending both ways and with both ends held in the opening. The sleeve member is swaged such that the flexible member is tightly held therein. At least one looping end of the flexible member is looped back on itself with a pair of clips therearound so that the loop can be placed over a wad of skin and pulled tight to grip the skin. Additionally the loops are made to fit over the leg of an animal to provide a grip for carrying or dragging the animal from the field and for hanging the carcass by the legs.

DESCRIPTION OF THE DRAWINGS

FIG. 5 shows a second embodiment of the invention;

FIG. 6 shows the method of transporting a dead animal using the second embodiment of the invention;

FIG. 7 shows the use of the invention for hanging up the carcass; and

FIG. 8 shows a third embodiment of the invention.

DESCRIPTION OF THE INVENTION

Figure 3:
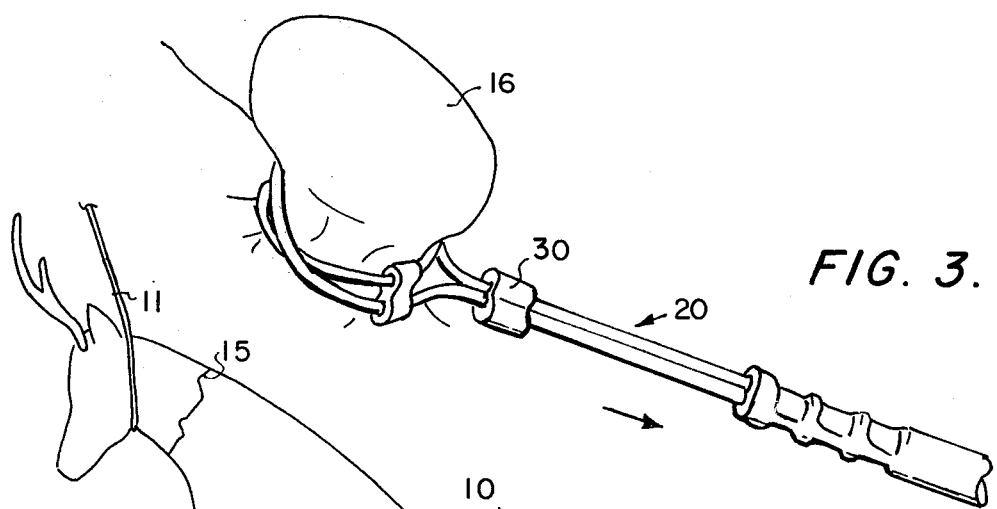
FIG. 3 shows the method of attaching the invention to an animal skin.
Figure 4:
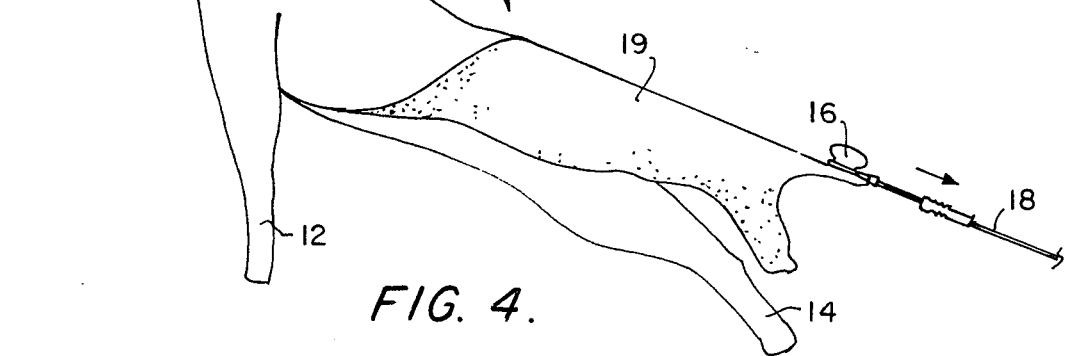
FIG. 4 shows the method of pulling the skin from a meat animal by power means.

In FIG. 4 is shown a method for skinning an animal 10 such as a deer which is hung by a loop 11 from a tree or similar support. The animal has previously been field-dressed which involves the splitting of the carcass down the stomach from the neck region to the annus and the removal of the innards. To prepare the animal for skinning the front legs 12 and the rear legs 14 are cut off below the knuckle and a cut 15 is made through the skin around the neck. Thereafter a wad of skin 16 (FIG. 3) is formed preferably by placing a rock (not shown) to the outside of the skin and pulling the skin around the rock to which is attached a holding device connected to a rope or cable 18. The cable 18 is usually pulled by attachment to a vehicle (not shown) to peel the skin downward from the neck and across the carcass in the manner shown for separating it from the carcass 19. As previously described, this manner of skinning a large meat animal is quick and maintains the animal in a clean state with little or no contact with the hair of the skin.

Figure 1:
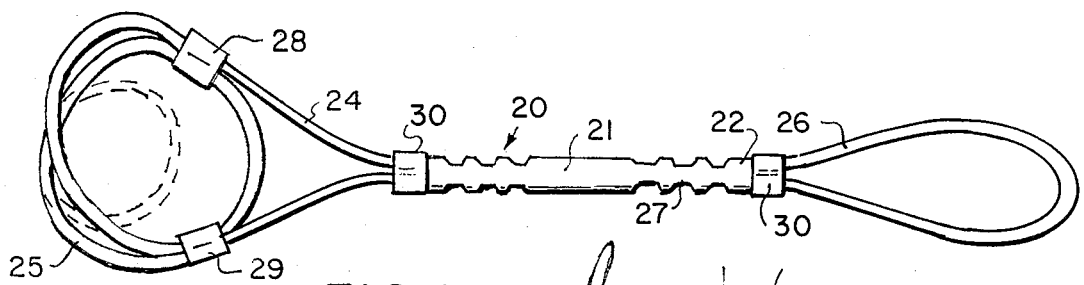
FIG. 1 shows a first embodiment of the invention.

The invention lies in the pulling device 20 shown in FIG. 1. As sleeve 21 having a center opening 22 extending the length thereof, is formed of an aluminum alloy or similar material which preferably is rustproof. Passing through the center opening 22 is an elongated flexible member 24 which in this instance is a wire cable forming a first loop 25 and a second loop 26 positioned at opposite ends of the cylinder. The ends of the cable are fixed within the sleeve by swaging in the areas 27 to firmly fix the cable in the opening. In this instance the sleeve is swaged six times to firmly hold the loops. In this embodiment the first loop 25 is folded back on itself to form a double loop which is maintained by a pair of clips 28 and 29 having openings therethrough through which both strands of the cable are passed. A third clip 30 is fitted around the loop as it extends from the sleeve.

To illustrate the manner in which the device is fixed to the animal skin, FIG. 3 shows the wad 16 of the skin with the loop 25 placed therearound. The wad 16 is round because the skin is placed around an object and the loop 25 is placed over the skin and around the small portion extending between the carcass and the rock. Thereafter the sleeve 21 is pulled while holding the skin and rock to cause the loop 25 to tighten as the cable slides through the clips 28 and 29. After tightening the loop, the clip 30 is moved from a position adjacent the sleeve towards the other clips to hold the loop around the skin. Thereafter by pulling on the second loop 26 the skin can be peeled from the carcass.

Figure 2:
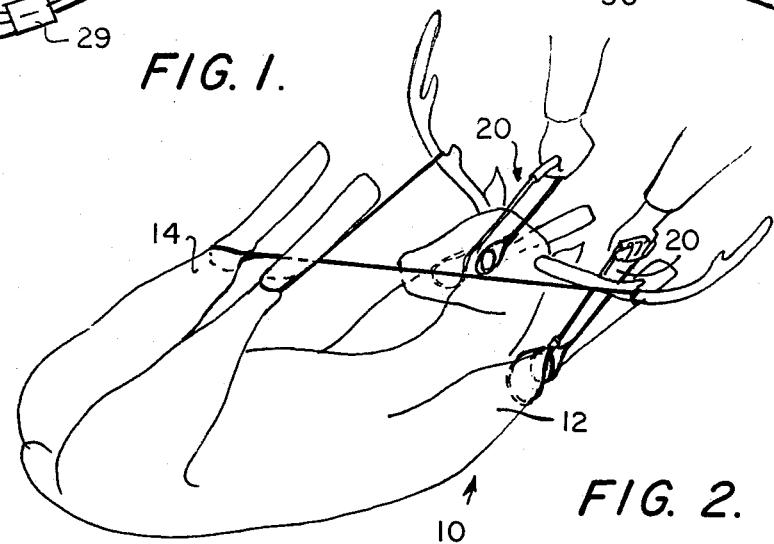
FIG. 2 shows a method of transporting a dead animal using the invention.

FIG. 2 illustrates a second use for the invention. It is frequently difficult to transport the dead animal from the field to a vehicle and for this purpose, the present device can be used to provide a hand-hold for dragging the carcass. Preferably two such devices, one for each foreleg, are used in the manner shown. The animal is positioned on its back and a device 20 is placed on each foreleg. It is preferable that the loop 25 be placed over the leg first for positioning closest to the body and above the knuckle. The second loop 26 is then slid over the leg in a manner such that the sleeve 21 can be grasped to drag the animal along the ground. It is preferable that a Bungee cord or rope 31 be connected between the two devices to support the head of the animal, otherwise a rope can be tied between the head and a hing leg to accomplish the same purpose. In this manner the animal can be dragged much easier.

In FIG. 5 is shown a second embodiment of the invention. The device 20A includes a pair of swaged sleeves 31 and 32 separated slightly by a mid-length of cable 34. As in the first embodiment a cable 35 extends through center openings (not shown) in each sleeve and forms a pair of loops 36 and 37 extending to each side of the sleeves. These loops each are doubled and include clips 38, 39 and 40, 41, respectively. Center clips 42 and 44, respectively, are provided to hold the loops, once tightened.

This device functions in the same manner except that a loop is included at each end. Therefore as shown in FIG. 6, the device can be fixed between the front legs 12 of a dead animal for dragging the body. Plastic sleeves 45 and 46 fit over the cables and serve as handholds for pulling. Thus the pulling device serves both as a hand-hold and to support the animal head thereby negating the need for extra ties for that purpose as was required with the first embodiment device.

Additionally as shown in FIG. 7, this second embodiment device is useful for hanging the carcass by the hind legs from a support such as a tree 47. By forming the swaged sleeves in two parts with a section of cable therebetween, the device will bend over a tree limb or other support to prevent slippage and hold the legs at equal elevations. Frequently it is desirable to hang the animal in the manner shown to allow for the drainage of body fluids.

In FIG. 8 is shown a third embodiment of the invention comprising a semi-rigid cable or member 48 terminating with swaged sleeves 49. These sleeves are preferably made of an aluminum alloy and include a central opening (not shown) into which the cable end is held. Clips 50 having center openings for receiving the cable doubled over are provided which can be slid towards the respective loop end to tighten the loop over the animal leg or hide for carrying or skinning an animal.

This device can also be used for carrying large game birds as well as animals. In order to make the device more versatile, the semi-rigid cable is used and the cable ends are not fixed in the clips. To shorten the length of cable between the clips as is necessary to carry certain game birds, the sleeves are pulled while holding the clips. This action shortens the mid-length portion of the device. Because of the semi-rigid action of the cable the tightening of the clip onto a leg or other extremity of a game bird or animal will maintain the device in the configuration of the shortened mid-portion. Also the sleeves 49 are caused to bind against the other cable portion when a pull is exerted on the loop, making this embodiment of the invention self-locking. By making the clip longer it can also serve as a handle for pulling dead animals in the manner of the embodiment shown in FIG. 6.

Thus there is provided a pulling device which is lightweight and easily carried yet can be used to transport, skin and hang meat animals. Also by making the device of lighter weight material, a carrier for large game birds such as turkeys is provided.

The invention claimed:

1. A pulling device comprising:
an elongated flexible cable;
a sleeve having an opening therethrough with the flexible cable ends held in said opening to form a loop extending from one end of the sleeve;
means holding the flexible cable in said sleeve;
said flexible cable being doubled over to form a double loop; and
means holding said flexible cable in the double loop configuration whereby said double loop can be fitted over an object and tightened to hold said object; and
a clip positioned around said cable as it exits said sleeve and being movable along said cable to hold it on said object.

2. A pulling device comprising:
an elongated flexible member;
a sleeve having an opening therethrough with the flexible member ends held in said opening to form a loop extending from one end of the sleeve;
means holding the flexible member in said sleeve;
means holding the flexible member loop doubled over to form a double loop which can be placed over an object for pulling;
a clip positioned around said loop as it exits said sleeve and being movable along said flexible member to hold it over an object; and
means allowing attachment to said sleeve for pulling said object.

* * * * *